United States Patent [19]

Layden

[11] 4,238,673
[45] Dec. 9, 1980

[54] VARIABLE LEAD DEVICE FOR CIRCULAR SCAN TRACERS

[75] Inventor: Lawrence M. Layden, Stanton, N.J.

[73] Assignee: Airco, Inc., Montvale, N.J.

[21] Appl. No.: 955,824

[22] Filed: Oct. 30, 1978

[51] Int. Cl.³ .............................................. G05B 1/00
[52] U.S. Cl. ..................................... 250/202; 250/236
[58] Field of Search ........................ 250/202, 234-236; 318/577

[56] References Cited

U.S. PATENT DOCUMENTS

| 3,004,166 | 10/1961 | Greene . | |
|---|---|---|---|
| 3,037,888 | 6/1962 | Lobosco et al. | 250/202 |
| 3,094,624 | 6/1963 | Wills | 250/202 |
| 3,128,383 | 4/1964 | Brouwer et al. | 250/202 |
| 3,499,155 | 3/1970 | Turbett | 250/202 |
| 3,704,372 | 11/1972 | Parker et al. | 250/202 |
| 3,704,373 | 11/1972 | Bardwell et al. | 318/577 |
| 4,128,297 | 12/1978 | Bourne . | |

*Primary Examiner*—David C. Nelms
*Attorney, Agent, or Firm*—David A. Draegert; Larry R. Cassett; Edmund W. Bopp

[57] ABSTRACT

An improved circular scan line tracing device for use in connection with flame or plasma cutting machines, as well as other machine tools, is disclosed which features provision for adjustment of the lead of the tracing device while the machine is operating.

7 Claims, 4 Drawing Figures

VARIABLE LEAD DEVICE FOR CIRCULAR SCAN TRACERS

FIELD OF THE INVENTION

This invention relates to the field of photoelectric line or edge tracing devices which are used to control flame or plasma cutting torches or other machine tools. More specifically, the invention comprises an improvement on circular scan tracing devices presently in use.

BACKGROUND OF THE INVENTION

For many years it has been common practice in the metal working art to use flame or plasma torches to cut out large sections of plate. Such torches can be held in the hand of an operator and guided by him; they can be mounted on tracks and provided with motors for straight line cutting; they can be pivoted about a central point to cut out circles; they can be adapted to follow a template cut out in advance; and they can be used on machines provided with optical-electronic "tracers" and appropriate servomotors and controls for movement of the torch (or torches) according to a blueprint or other plan. The invention relates to the last class of devices. Several different types of tracers have been made which have been of some success. One such is the "circular scan" tracer, an improvement on which is the subject of the present application. Such circular scanning tracer devices are described at least as early as U.S. Pat. No. 3,004,166; more advanced versions of such tracers are described in U.S. Pat. No. 3,704,372. The present invention may to some extent be construed as an improvement on that shown in U.S. Pat. No.3,704,372 and the specification of that patent is therefore hereby adopted and made a part of the present specification. Where possible reference will be made to such patent in order to simplify the description of the present invention.

One deficiency of the tracer shown in U.S. Pat. No. 3,704,372 is that no provision is made for ready adjustment of the "lead" of the tracer. The lead of such a tracer is the distance between the point at which a change in the line being traced is detected and the point on the line corresponding to the actual position of the torch. Some lead is necessary because there is an inevitable delay between the tracer's sensing that a change of direction of travel is necessary and the actual change of direction, mostly due to the momentum of the machine. Momentum being a function of velocity, the lead must be varied with the travel speed. If too little lead is used the torch tends to overshoot corners, particularly if they are sharp, and if too much lead is used corners tend to be rounded off. As the same tracers and cutting machines are commonly used with oxy-fuel cutting torches, for which travel speeds of approximately 30 to 100 ipm (inches per minute) (75–250 cm/min) are appropriate, and with plasma torches which cut at 200 to 250 ipm (500–625 cm/min), a tracer the lead of which is readily adjustable is clearly desirable.

U.S. Pat. No. 3,704,372, referred to above, describes a tracer having means for varying the lead; however, said means are not convenient to use as they require at least partial disassembly of the tracing unit and replacement of one of its parts with another, in order that the lead may be varied. It is therefore, clearly desirable to produce a circular scan tracer having its lead readily adjustable; preferably the lead would be adjustable even while the machine is running which would simplify the adjustment of the lead under given operating conditions.

OBJECTS OF THE INVENTION

It is therefore an object of the invention to provide an improved photoelectric scanning device.

Another object of the invention is to provide a circular scanning device having adjustable lead.

Yet another object of the invention is to provide a circular scanning tracer device which has a lead which may be varied and adjusted while the machine is in operation.

A final object of the invention is to provide an improved circular tracing scanning device having lead which may be varied while the machine is operational, which can be manufactured at a reasonable cost.

SUMMARY OF THE INVENTION

The present invention satisfied the needs and desires of the art and the objects mentioned above by its substitution of a pivoted mirror, the angle of which to the rotational axis of the machine can be adjusted, for the replaceable, fixed angle mirrors used in the class of tracers exemplified by U.S. Pat. No. 3,704,372. By adjusting the angle of the mirror the lead of the tracer is adjusted; means are provided whereby the angle can be adjusted even while the machine is operating. In a preferred embodiment, the angle can be adjusted continuously, thus providing continuously variable lead to the tracer.

BRIEF DESCRIPTION OF THE DRAWINGS

The invention will be better understood by reference to the drawings in which.

DESCRIPTION OF THE PREFERRED EMBODIMENTS

Figure 1:
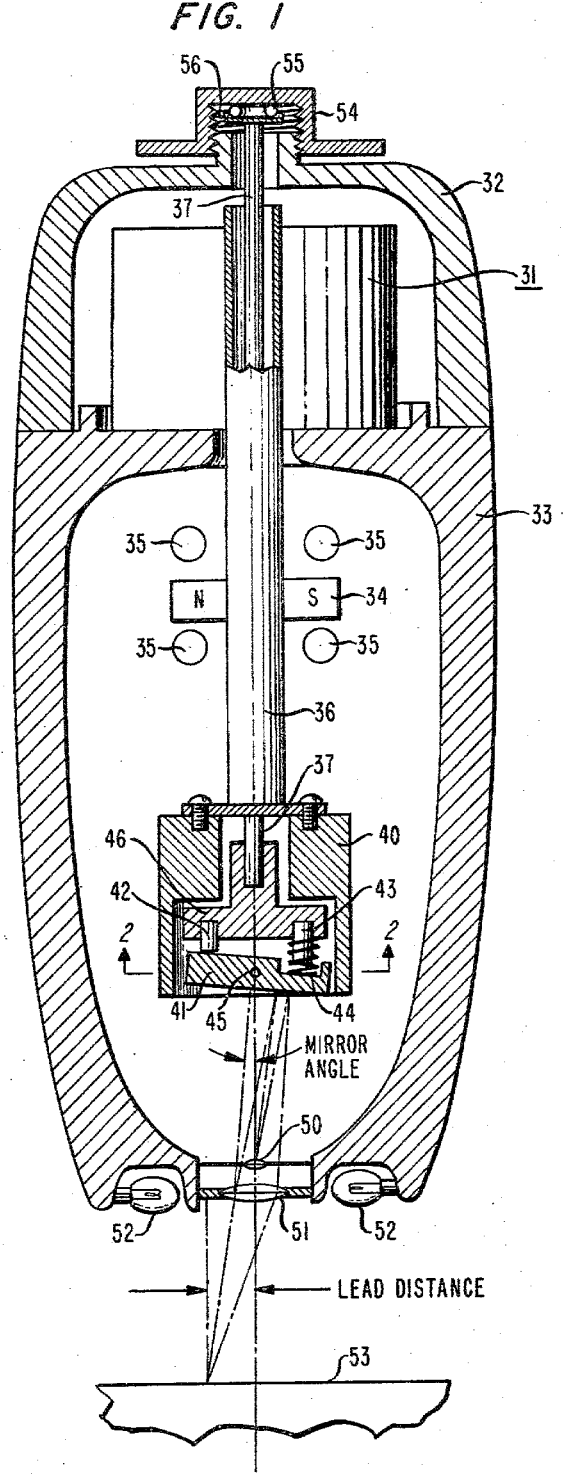
FIG. 1 represents a cross sectional view of one type of tracer according to the invention.

As mentioned above, the present invention can to some extent be construed as an improvement on the circular scanning tracing device described and claimed in U.S. Pat. No. 3,704,372. The operation of such devices is fully described in the specification of that patent and therefore will only be summarized here for purposes of simplicity.

Such circular scanning tracing devices provide a motor on the shaft of which is mounted a mirror which is not perpendicular to the axis of the motor; that is, it is a "nutating" mirror. A magnet and pickup coils are also provided to send a regular sine wave signal to electronic control devices which control the servomotors driving the entire flame cutting unit along orthogonal axes. Flood lights are provided which light the pattern being traced. This light is reflected from the pattern, through a lens, off the angled mirror and onto a photocell. Since the angled mirror is rotating, the photocell "sees" a spot the location of which rotates on the pattern. When light is not reflected from the white section of the pattern but is rather absorbed by a black line or an edge the photocell output varies, thus producing a signal. By comparing the timing of the signal sent by the photocell with that provided by the magnet and coil assembly, mentioned above, the logic circuits of the control unit are provided with information which is then used to control the servomotors of the cutting machine.

As mentioned above and as well known in the art it is necessary that in order for a tracer to properly respond to changes in orientation of the line being traced the instructions relating to these changes must be received in the control system of the cutting machine some time before the change is to be made, in order that the momentum of the machine and any delays in the control system do not deform the cut piece. Thus, some "lead" must be provided. Furthermore, it is apparent that the lead must be varied in accordance with velocity of the machine, since the momentum is a direct function of velocity. Clearly, a certain minimum lead is required for a given cutting velocity. It is also well known that if too much lead is used for a given velocity, the accuracy of the cut will also be impaired, because the control system will respond at the same speed it would at higher velocity; thus, for example, square corners tend to be rounded off when too much lead is used.

It will therefore be apparent that in a system which is capable of cutting at different speeds, depending on, for example, the thickness of plate to be cut and the type of torch to be used, it is essential that the lead be variable. In the prior art such variable lead was provided by replacement of the angled mirror on the motor shaft with a mirror having a different angle; such an arrangement is shown in U.S. Pat. No. 3,704,372. While this method works well enough, it is inconvenient and time-consuming. Moreover, only leads corresponding to the mirror angles supplied are available; the lead is only discretely variable. The present invention overcomes these difficulties by its provision of a workable mechanism which allows adjustment of the mirror and hence of the lead without dismantling the machine. In fact, the present invention allows the lead to be adjusted while the machine is moving, which is very useful when setting the machine up to make a given cut; the operator can simply run the tracer around the pattern to be traced without starting the torches and can examine the accuracy of the trace, adjusting the lead as required.

Reference will now be made to the drawings whereby a clear understanding of the invention will be obtained.

FIG. 1 shows a cross section of one embodiment of a tracer according to the invention. Motor 31 rotates its shaft 36 to which is attached mirror carrier 40 and mirror assembly 41, 45, 46. Because the mirror rotates, the light cast by lamps 52 on pattern 53, reflected towards the mirror through lens 51, and off mirror 41 onto photocell 50, represents a circular scan of pattern 53. As the intensity of the spot of light read by photocell 50 changes when, for example, the light beam crosses a line of the pattern or goes from a dark area into a light area, a signal is put forth by photocell 50. Shaft 36 also rotates magnet 34 between coils 35, generating a reference signal which can be compared with the signals generated by photocell 50, in the manner taught in U.S. patent 3,704,372, and used to control the motion of the tracer and associated cutting torch(es) or machine tools.

Figure 2:
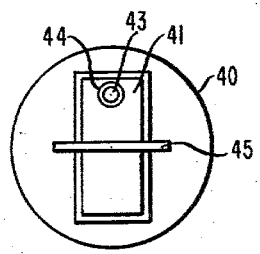
FIG. 2 represents an elevation of one part of that tracer.

The improvement made by the present invention is the provision of pivot 45 and associated adjustment mechanism for mirror 41. As mirror 41 pivots, it will be apparent that the lead distance, indicated in FIG. 1, is changed as a direct function of the mirror angle, also indicated on FIG. 1. The mirror angle is changed by moving rod 37 up or down with respect to motor shaft 36. This motion up or down is provided by adjusting knob 54 which is threaded onto housing 32. By turning knob 54 with respect to housing 32, the cooperating screw threads on these parts cause the knob 54 to push down via thrust bearing 55 and flange 56 onto rod 37. This in turn moves mirror adjuster 46 down with respect to mirror carrier 40. As the mirror 41 is pivoted on part 40 (as will perhaps be more clear from an examination of FIG. 2), pin 42 pushes down on the mirror, forcing it to pivot. Spring 44 and locating pin 43 are provided so that when the mirror pivots, thus changing the mirror angle and lead, the mirror is kept in contact with pin 42. In this way adjustment of lead may be provided. It will be apparent that any desired degree of lead may be provided by this mechanism and that the operator is thus not restricted to values set by the angles of preset mirrors; therefore, the lead is continuously variable.

Provision must be made in any cutting machine for "kerf compensation"; that is, allowance for the width of the cut. Kerf compensation is provided in the tracer of the invention in the same way as in the tracer described in U.S. Pat. No. 3,704,372; that is, the housing is made in two parts 32 and 33; by rotating one with respect to the other, kerf adjustment is effected.

Figure 3:
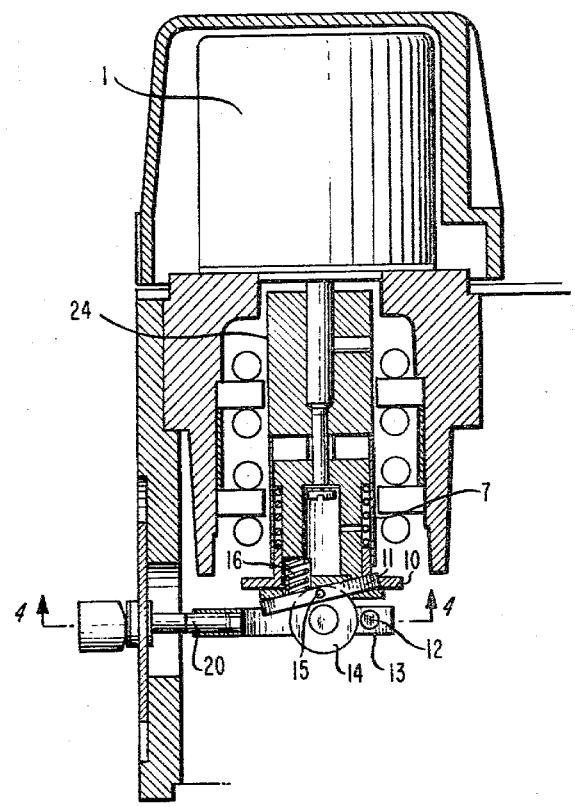
FIGS. 3 and 4 represent similar views of a second embodiment of the tracer according to the invention.
Figure 4:
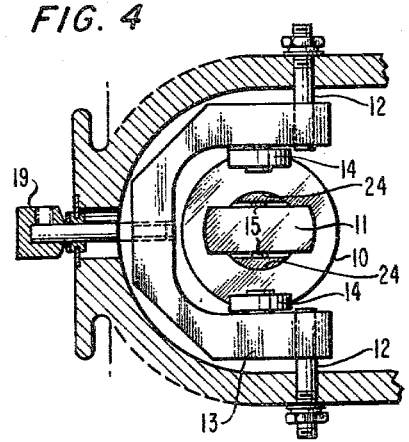

A second embodiment of the invention is shown in similar views in FIGS. 3 and 4. There motor 1 spins assembly 24 on which is carried mirror 11, which is pivoted by means of pivot 15, on mirror carrier 10. Rather than the threaded knob arrangement shown in FIG. 1, adjustment is provided by means of a yoke 13 pivoted on pivots 12 and operated by knob 19 which pushes the mirror carrier 10 up or down via cam followers 14 with respect to the assembly 24. As the mirror assembly is moved up or down by moving the yoke assembly, cam followers 14 push against the mirror carrier, thus pushing the mirror against assembly 24 and forcing the angle to change. Springs 7 and 16 keep the mirror engaged with assembly 24. The optical, kerf correction and control arrangements of the embodiment shown in FIGS. 3 and 4 are similar to those described above with reference to FIGS. 1 and 2.

It will be apparent that other embodiments of the invention are conceivable, in addition to the two described above. Therefore, the invention should not be construed as limited to the embodiments described above, but as more properly defined by the following claims.

I claim:

1. In a photoelectric tracer of the type wherein a nutating mirror scans a pattern to be traced, the improvement which comprises: mounting the mirror on a pivot and providing means for adjusting the angle of said mirror with respect to its axis of rotation, whereby the lead of the tracer may be varied during the scan.

2. A photoelectric tracer comprising: a motor, a mirror, a lens, a photocell, and suitable mounting structure, the mirror being mounted on the shaft of the motor and nearly perpendicular thereto, the lens, mirror, and photocell being arranged so that when the motor is energized, the mirror directs a rotating beam of light onto the photocell, wherein means for adjustment of the angle of the mirror with respect to the shaft of the motor during mirror rotation are provided.

3. The tracer according to claim 2, wherein said means for adjustment of the mirror angle comprise the shaft of the motor being hollow, a control rod being mounted within the hollow shaft and adapted so as to be movable longitudinally with respect to the shaft, and the mirror being pivoted for variation of its angle with respect to the shaft, the degree of pivoting being controlled by the control rod.

4. The tracer according to claim 3 wherein the mirror is pivoted on a pivot mounted on a mirror carrier which is fixed to the motor shaft and is biased against a pin by a spring, both spring and pin being mounted on a mirror adjuster which is moved with respect to the mirror carrier by motion of the control rod with respect to the motor shaft, thus varying the lead.

5. The tracer according to claim 2, wherein said means for adjustment of the mirror angle comprise: the mirror being mounted by means of a pivot on a mirror carrier, said mirror carrier being movable with respect to the motor shaft, and the mirror being so arranged that motion of the mirror carrier with respect to the motor shaft causes the angle of the mirror to change, thus varying the lead.

6. The tracer according to claim 5, wherein the motion of the mirror carrier with respect to the motor shaft is caused by a pivoted yoke carrying a control knob and two cam followers, which bear on the mirror carrier, so that moving the control knob pivots the yoke and causes the cam followers to move the mirror carrier, thus varying the lead.

7. In a circular scanning pattern tracing device of the type having a photocell, a shaft rotatable about an axis, a mirror mounted on the shaft at an angle to the axis of rotation, a motor for rotating the shaft, and means for mounting the photocell, shaft, and motor so that, when the motor is energized, light from a pattern to be traced is reflected off the rotating mirror onto the photocell, the improvement which comprises: a pivot for mounting the mirror on the shaft, and means for adjusting the angle of the mirror with respect to the axis of rotation during mirror rotation.

* * * * *